Figure 4:
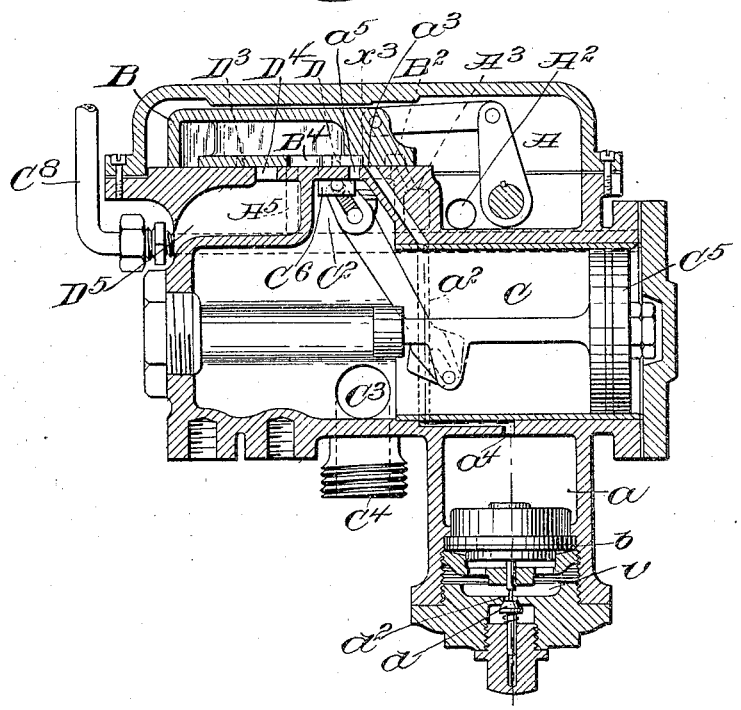

No. 725,181. PATENTED APR. 14, 1903.
C. W. VALENTINE.
AIR BRAKE.
APPLICATION FILED DEC. 31, 1902.
NO MODEL. 2 SHEETS—SHEET 1.
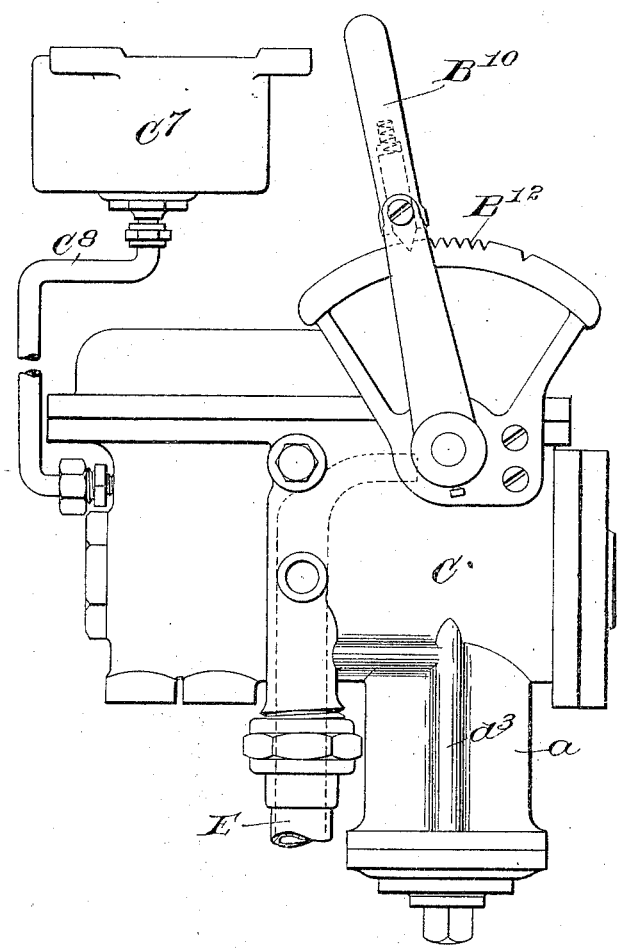
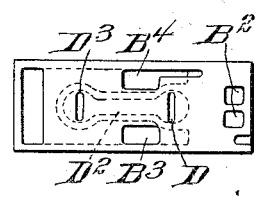
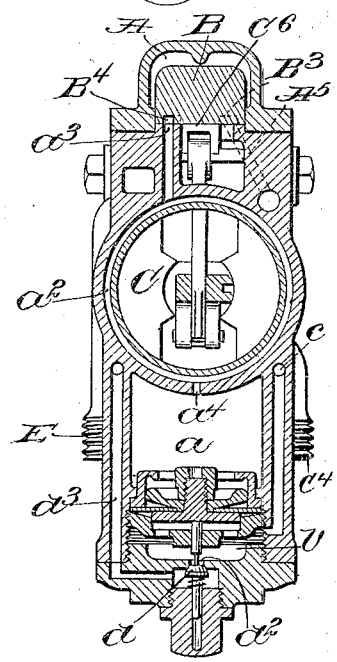

No. 725,181. PATENTED APR. 14, 1903.
C. W. VALENTINE.
AIR BRAKE.
APPLICATION FILED DEC. 31, 1902.
NO MODEL. 2 SHEETS—SHEET 2.

Witnesses: Inventor.
Charles W. Valentine,
by J. P. and H. E. Livermore,
Attys.

UNITED STATES PATENT OFFICE.

CHARLES WHITALL VALENTINE, OF WATERTOWN, NEW YORK, ASSIGNOR TO NEW YORK AIR BRAKE COMPANY, OF NEW YORK, N. Y., A CORPORATION OF NEW JERSEY.

AIR-BRAKE.

SPECIFICATION forming part of Letters Patent No. 725,181, dated April 14, 1903.

Application filed December 31, 1902. Serial No. 137,313. (No model.)

*To all whom it may concern:*

Be it known that I, CHARLES WHITALL VALENTINE, of Watertown, county of Jefferson, and State of New York, have invented an Improvement in Air-Brakes, of which the following description, in connection with the accompanying drawings, is a specification, like letters on the drawings representing like parts.

The present invention relates to devices to be used in an automatic air-brake system and is embodied in means for preventing reduction in the train-pipe pressure by leakage after the brakes have been applied.

The principal purpose of the invention is to compensate for any reduction of pressure in the train-pipe which may result from leakage or otherwise, which reduction of pressure, if not compensated for, would result in an increased application of the brakes when the brakes have been applied with a graduated or partial application, such as would be used for the purpose of controlling the train on a long grade, for instance. As an example, if the brakes have been applied at the top of a long grade to the degree of braking force desired by the necessary reduction of pressure in the train-pipe it is obvious that any further reduction of pressure in the train-pipe, due, for example, to leakage, will gradually cause the brakes to become more firmly set and the amount of air in the auxiliary reservoirs to become reduced, which is objectionable for various reasons. It is the purpose of the present invention automatically to retain the train-pipe pressure at any desired point during the time the brakes are applied, so that any substantial loss of pressure due to leakage is prevented without attention on the part of the engineer after his brake-valve has been set at the desired point.

The invention is embodied in means for entrapping in an auxiliary chamber a certain amount of air at the same pressure as that of the air in the train-pipe after the brakes have been applied, the entrapped air acting on one side of a movable abutment, such as a diaphragm, the other side of which is acted upon by the pressure in the train-pipe, and the said diaphragm controls a valve interposed in the connections between the main reservoir and the train-pipe, the said valve being opened in response to a preponderating pressure of the entrapped air and being closed in response to a preponderating pressure of the air in the train-pipe. Thus any reduction in the train-pipe pressure below the desired pressure will cause the said valve to be opened, admitting air from the main reservoir to the train-pipe until the train-pipe pressure and the pressure of the entrapped air become equalized, when the valve will be seated and the air from the main reservoir cut off.

The invention is herein shown as applied to an engineer's valve of that type in which an automatic cut-off valve is employed for the purpose of cutting off the escape of air from the train-pipe after the pressure has been reduced to the necessary extent for the desired application of the brakes. An engineer's valve of this type is shown and described in Letters Patent of the United States to Vaughan and McKee, No. 501,290, dated August 29, 1893.

Figure 1 is a side elevation of an engineer's valve embodying the invention. Fig. 2 is an underneath plan view of the slide-valve, indicating the pockets and passages which control the valve-ports. Fig. 3 is a transverse vertical section of the main valve, taken on the line $x^3$ of Fig. 4. Fig. 4 is a longitudinal section taken on the line $x^4$ of Fig. 5, and Fig. 5 is a plan view of the valve-seat.

To afford a better understanding of the invention, the operation of the type of engineer's valve herein shown may be briefly described as follows: The chamber A is in direct communication with the main air-reservoir and is provided with an outlet $A^2$, which leads through a pressure-maintaining or "excess-pressure" valve (indicated at $A^{20}$) to a pocket $A^3$, (shown in dotted lines in Figs. 4 and 5,) having an outlet-port $A^4$, controlled by the slide-valve B. When the slide-valve is in running position, as shown, air may pass from the main reservoir by way of the chamber A, passage $A^2$, through the excess-pressure valve $A^{20}$ into the pocket $A^3$, and thence by a passage shown in dotted lines in Figs. 4 and 5 to the port $A^4$ in the valve-seat and up into the pockets $B^2$ of the slide-valve B, and then down through the large opening $C^2$ into the chamber C, which communicates through an outlet $C^3$ with the train-pipe $C^4$. Thus the air in the train-pipe is maintained at such pressure as may be derived from the main reservoir modified by the action of the excess-pressure valve. The chamber C contains a piston $C^5$, which normally stands in the position shown in Fig. 4, the said piston controlling an automatic cut-off valve $C^6$, the purpose of which is to cut off the train-pipe exhaust when the necessary reduction of pressure has been attained to set the brakes to the degree of braking force desired. The left-hand side of the piston $C^5$ is continually acted upon by the pressure of the air in the train-pipe, while the right-hand side is acted upon by the pressure of air contained in an auxiliary chamber $C^7$, which communicates with the chamber C through a pipe $C^8$. The auxiliary chamber is charged with air at normal train-pipe pressure, any suitable expedient being employed for the purpose—such, for example, as a passage $A^5$, leading from a port $A^6$ in the valve-seat to the auxiliary chamber—the said port being normally (i. e., when the valve is in running position) in communication through the pocket $B^3$ of the valve B with the chamber C. To set the brakes, the slide-valve B is moved by means of its operating-handle $B^{10}$ toward the right until communication between the main reservoir and the train-pipe through the excess-pressure valve is cut off. The same movement carries a port D beyond the edge of the cut-off valve $C^6$. The said port D communicates, through a pocket $D^2$, with a port $D^3$, which by the same movement of the slide-valve B comes in line with the port-opening $D^4$ of a passage $D^5$, leading to the open air. Compressed air will thus escape from the chamber C and from the train-pipe, which is in communication therewith, reducing the pressure in the train-pipe and setting the brakes, as is well understood. The same movement, however, closes the port $A^6$, so that the air in the auxiliary reservoir $C^7$ is entrapped there, and as the air entrapped is at the original train-pipe pressure said air acting upon the right side of the piston $C^5$ exceeds the reduced train-pipe pressure acting on the left side of said piston and causes a movement of said piston to the left as the train-pipe pressure becomes reduced. As the piston is connected with the cut-off valve $C^6$ by means of a pivoted lever, as shown in Fig. 4, the said cut-off valve $C^6$ will be caused to move to close the port D, and thus prevent the further escape of compressed air from the train-pipe. The air confined in the auxiliary chamber $C^7$ expands in thus moving the piston $C^5$ and the cut-off valve $C^6$, and consequently the pressure of said confined air diminishes in proportion to the distance through which the said piston is thus moved, and the capacity of said supplemental reservoir is so proportioned that the reduction in pressure by expansion equals the reduction in train-pipe pressure desired to be attained by the engineer, as determined by moving the operating-handle $B^{10}$ of the main slide-valve B a greater or less distance toward the right from the running position. (Shown in Fig. 1.) Thus the desired reduction in the train-pipe pressure and consequent degree of braking pressure may be obtained by moving the handle $B^{10}$ to the desired one of the graduated notches $B^{12}$, (see Fig. 1,) as such movement will carry the port D a corresponding distance beyond the edge of the cut-off valve $C^6$ when in its normal position, (shown in Fig. 4,) thus requiring a corresponding movement of said cut-off valve and of the piston $C^5$ to cause the said cut-off valve to again close the port D, and thus stop the further escape of air from the train-pipe. This movement of the piston, as just explained, will involve a corresponding reduction of the pressure of the air in the auxiliary chamber $C^7$ due to its expansion, and consequently said movement cannot be completed until the train-pipe pressure has been correspondingly reduced by the escape of the train-pipe air, so that said train-pipe pressure on the left-hand side of the piston $C^5$ may be overcome by the auxiliary-chamber pressure on the right-hand side of said piston sufficiently to produce the requisite movement of said piston to cause the port D to be closed. The engineer is thus enabled to make any desired reduction of pressure in the train-pipe by merely setting his valve-actuating handle in the desired position, so as to give a greater or less length of movement to the port D, requiring a greater or a less movement of the piston $C^5$ and its attached cut-off valve $C^6$ to cut off the train-pipe discharge.

It is apparent that if the brakes are applied with a certain force in the manner above described and leakage from the train-pipe then occurs, so that a further reduction of pressure in the train-pipe is made, the brakes will be set with a greater and greater force as the train-pipe pressure continues to become more reduced, which is very undesirable in many instances, and the engineer can withdraw this excess of braking force only by releasing the brakes and reapplying them. In accordance with the present invention, however, the system is provided with means for automatically maintaining whatever pressure there is in the train-pipe, so that the brakes can be maintained set for any length of time at any desired pressure without further operation of the engineer's valve. This is accomplished by providing the apparatus with a pressure-chamber, which is adapted when the brake-valve is first operated to reduce the train-pipe pressure for applying the brakes to receive air at a pressure equal to the reduced train-pipe pressure, the said air then being entrapped in said chamber, so that its pressure is maintained constant. A passage is also provided for air to go from the main reservoir to the train-pipe to compensate for leakage of air from the train-pipe, which passage is controlled in response to any difference in pressure between that of the entrapped air and that of the air in the train-pipe, so that the pressure in the train-pipe is automatically maintained constant.

Figure 5:
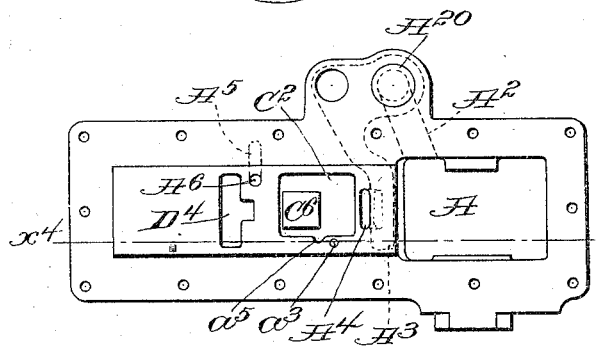

As shown in Figs. 1, 3, and 4, the pressure-chamber $a$ may be supported by or made a part of the casting in which the chamber C is formed, there being an annular groove or channel $a^2$ formed around the chamber C, communicating with a port $a^3$, Fig. 5, in the main-valve seat and with a port $a^4$ in the chamber $a$, the port $a^3$ being suitably controlled by the slide-valve B, as shown in Fig. 4. To control the said port $a^3$ and the pressure of air in the chamber C, the slide-valve B is provided with a pocket $B^4$, Fig. 2, which when the valve is moved to service-application position opens communication between the said port $a^3$ and the chamber C, the elongated portion of said pocket then overlapping the port $a^3$ and the recess $a^5$, Fig. 5, the latter communicating with the chamber C. The said chamber C contains train-pipe air, so that air at the pressure of that then in the train-pipe will flow into and fill the chamber $a$. In this service-application position air is discharging from the train-pipe to the open air, and when this discharge from the train-pipe and chamber C is cut off by movement of the cut-off valve $C^6$ in the way already described there will be air in the train-pipe and air in the chamber $a$ under substantially equal pressures. If then the main-valve handle is moved to lap position—that is to say, the position in which all the ports are closed—the air in the chamber $a$ becomes entrapped by the closure of the port $a^3$, so that there is air within the said chamber under a constant pressure and substantially equal to that of the reduced pressure of train-pipe air in proportion to which reduction the brakes have been set.

The chamber $a$ contains an abutment, such as a diaphragm $b$, which is acted upon at one side by the pressure in said auxiliary chamber and at the other side by the pressure in the train-pipe, there being a duct $c$, which leads from the train-pipe to a portion of the casing in which the chamber $a$ is formed, the said portion constituting a chamber V at the opposite side of the diaphragm $b$. The said diaphragm is arranged to act upon a puppet-valve $d$, which controls the port $d^2$, which leads from a passage $d^3$, directly connected with the main-reservoir pipe E, to the chamber V, which communicates with the train-pipe. If, therefore, the train-pipe pressure becomes reduced through any cause, the pressure exerted upon the diaphragm $b$ by the air in the chamber $a$ will produce such a movement of said diaphragm as to open the puppet-valve $d$, thus letting air into the train-pipe directly from the main reservoir, restoring such loss of pressure as may have taken place in the train-pipe. When the pressure in the train-pipe becomes equal to that in the chamber $a$ or slightly in excess thereof, the diaphragm will be raised and the valve $d$ closed, which closure may be aided by means of a spring below the valve $d$.

In the operation of the brake the engineer, after setting the brakes by moving the handle of his valve to the desired notch and waiting long enough for the cut-off valve $C^6$ to close the exhaust from the train-pipe to the open air, will then return the brake-handle to lap position, after which the maintenance of the desired pressure in the train-pipe becomes automatic, as described.

It is to be understood that the invention is not limited to the specific construction and arrangement herein shown and described, since modifications may be made without departing from the invention.

I claim—

1. In an air-brake system, the combination with the train-pipe and means for reducing the pressure therein; of a chamber having an inlet-port controlled by said pressure-reducing means, said inlet-port when open communicating with the train-pipe; means for closing the said port after having attained the desired reduction in the train-pipe pressure; a port leading from the main reservoir into the train-pipe; and a valve controlling said port operating in response to the difference in pressure between the air in said chamber and the air in the train-pipe, substantially as described.

2. The combination with the train-pipe; of means for reducing the pressure of the air therein; a chamber having an inlet-port communicating with the train-pipe and controlled by said pressure-reducing means; a valve controlling a port leading from the main reservoir to the train-pipe; and a diaphragm in said chamber controlling the said valve, the said diaphragm being subjected to pressure on one side by the air in the train-pipe, and on the other side to pressure of the air in the chamber.

In testimony whereof I have signed my name to this specification in the presence of two subscribing witnesses.

CHARLES WHITALL VALENTINE.

Witnesses:
JOHN C. THOMPSON,
E. MCGARRAH.